J. F. ENZ.
APPARATUS FOR THE PRODUCTION OF SKIMMED MILK AND VEGETABLE FAT COMPOUNDS.
APPLICATION FILED APR. 9, 1917.
1,243,275. Patented Oct. 16, 1917.
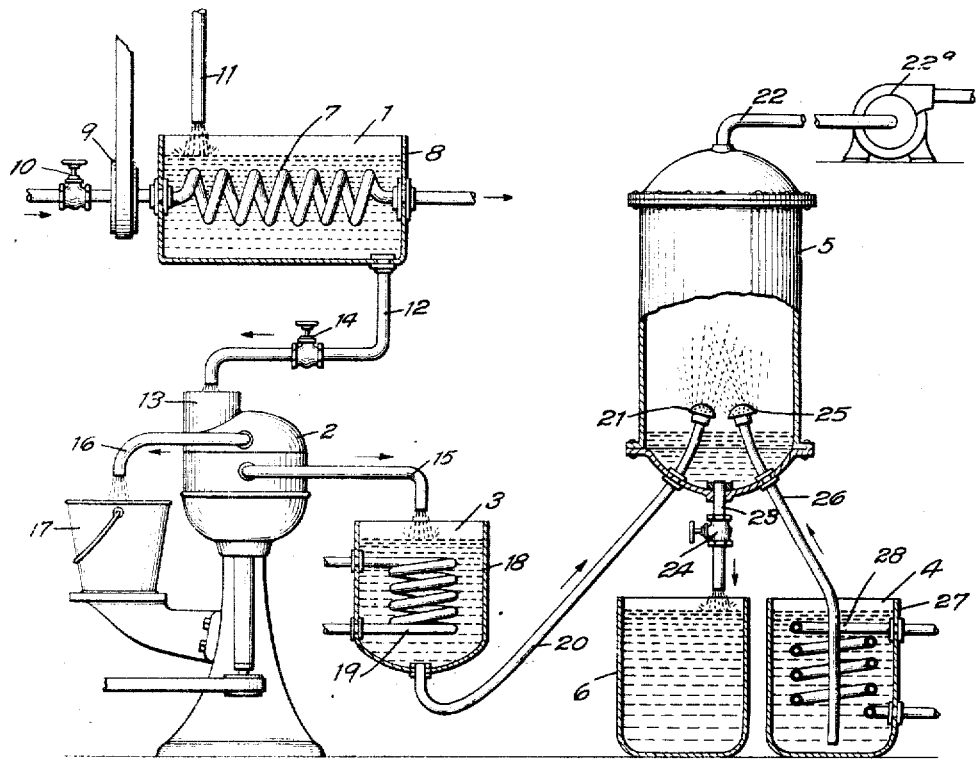
Witnesses:
F. E. Arthur
W. Thornton Bogert
Inventor
John F. Enz
By Walter F. Murray
Attorney

UNITED STATES PATENT OFFICE.

JOHN F. ENZ, OF DENMARK, WISCONSIN.

APPARATUS FOR THE PRODUCTION OF SKIMMED-MILK AND VEGETABLE-FAT COMPOUNDS.

1,243,275.     Specification of Letters Patent.     Patented Oct. 16, 1917.

Application filed April 9, 1917. Serial No. 160,716.

*To all whom it may concern:*

Be it known that I, JOHN F. ENZ, a citizen of the United States of America, and resident of Denmark, in the county of Brown and State of Wisconsin, have invented a new and useful Improvement in Apparatus for the Production of Skimmed-Milk and Vegetable-Fat Compounds, of which the following is a specification.

An object of my invention is to produce an improved apparatus for the production of a compound of skimmed milk and a vegetable fat, in which a thorough emulsification of the constituents of such a compound is obtainable.

This and other objects are attained in the apparatus described in the following specification and illustrated in the accompanying drawings, in which, the figure is a more or less diagrammatic representation of my improved apparatus.

The principal elements of the apparatus illustrated consist of a whole milk heater 1, a separator 2, a skimmed milk heater 3, a vegetable fat heater 4, a compound evaporating and emulsifying chamber 5, and a receiver 6 for the finished product.

The whole milk heater 1 is provided with a steam heating coil 7 arranged for rotation in a receptacle 8 which receives the whole milk. This coil may be rotated by any suitable means such as pulley 9, and the steam passing through the coil may be controlled in any suitable manner such as by the valve 10. The milk is delivered to the receptacle 8 through piping 11 or it may be poured therein directly from the milk cans. At the bottom of receptacle 8 a pipe 12 is connected, this pipe discharging directly, into the receiving opening 13 of the milk separator 2. The rate of discharge from pipe 12 may be controlled by a valve 14.

Separator 2 is preferably of the centrifugal type in which the skimmed milk is discharged therefrom through a pipe 15 extending to one side of the separator and the cream is discharged through a pipe 16 extending to the opposite side of the separator. A receptacle 17 is provided for receiving the cream delivered from pipe 16. The skimmed milk discharged from pipe 15 enters skimmed milk heater 3. This heater consists of a receptacle 18 in which a stationary steam heating coil 19 is located. Connected with the bottom of receptacle 18 is a pipe 20 which extends through the bottom of evaporating and emulsifying chamber 5.

The upper end of pipe 20 extends into chamber 5 and is provided with a sprayer head 21. This chamber is designed to withstand a vacuum sufficient to cause the skimmed milk to flow through pipe 20, and to issue from sprayer head 21, in the form of an atomized spray of heated skimmed milk. The exhaust from vacuum chamber 5 is conducted through a pipe 22 which is connected with a vacuum fan 22$^a$ which carries off the evaporated moisture from the sprayed milk. Adjacent to sprayer head 21 is a sprayer head 25 which is mounted on a pipe 26 extending to the vegetable fat heater 4, is provided. This pipe 26 extends to the bottom of receptacle 27 of the vegetable fat heater so that the vacuum produced in chamber 5 may operate to cause the liquefied and heated vegetable fat to pass through the pipe and to issue from the sprayer head 25 in the form of a spray of heated vegetable fat as disclosed. The sprayer heads 21 and 25 are located so that the sprays issuing therefrom may intermingle and fall to the bottom of chamber 5 in an emulsified and thoroughly intermixed condition. A steam heating coil 28 is provided in receptacle 27 for the purpose of maintaining the vegetable fat located in the receptacle 27 in a liquefied and heated condition. The concentrated product of this evaporating process falls to the bottom of evaporator 5 where it may be drawn off through a pipe 23 which is provided with a valve 24 for controlling the discharge therefrom. Receptacle 6 is provided for the reception of the emulsified compound.

In using my improved apparatus, fresh clean whole milk is poured into receptacle 8 of the milk heater 1. Steam heating coil 7 thoroughly agitates and heats this milk, the amount of steam passing through the coil being regulated to heat the milk to a temperature of approximately 100 degrees Fahrenheit. The milk delivered to receptacle 8 is that known as whole milk, that is milk which contains all of its cream. The purpose of heating the milk in this manner is to facilitate the entire removal of all of the butter fat in the separator. Pipe 12 as well as each of the other pipes employed in the apparatus are rendered thoroughly sanitary by being coated interiorly with porcelain or other sanitary material.

The whole milk having been delivered to separator 2, the cream is discharged through pipe 16 into receptacle 17 thus rendering the butter fat available for separate consumption. The skimmed milk delivered through pipe 15 is discharged into receptacle 18. Steam heating coil 19 located in this receptacle is adapted to heat the skimmed milk to a temperature of 212 degrees Fahrenheit. At this temperature the skimmed milk is drawn through pipe 20 into chamber 5 where the spraying and evaporating thereof takes place. Simultaneously with the spraying and evaporating of the skimmed milk within chamber 5, the vegetable fat located in receptacle 27 and which has been brought to a temperature of approximately 125 degrees Fahrenheit by means of steam coil 28, is drawn through pipe 26 and is sprayed from sprayer head 25 to intermix with the spray issuing from sprayer head 21. This heating of the vegetable fat changes it from its ordinary stiff congealed condition to a thin liquid capable of being sprayed and broken up into small particles. The intermixing of the atomized particles of the heated skimmed milk and vegetable fat after being accomplished, the mixture falls to the bottom of evaporating chamber 5 in the form of an emulsified compound of skimmed milk and vegetable fat. The skimmed milk during this atomizing process has also become concentrated, a great proportion of the moisture therein having been evaporated and drawn off through discharge pipe 22. The product is then drawn off through pipe 23 into receptacle 6 and is now in condition to be used.

Having thus described my invention, what I claim is:

1. An apparatus for the production of a compound of skimmed milk and vegetable fat consisting of a receptacle for holding and heating skimmed milk, a receptacle for holding and heating vegetable fat, a mixing receptacle, a pipe connecting the milk receptacle and the mixing receptacle, a pipe connecting the fat receptacle and the mixing receptacle, the ends of the pipe converging, sprayers located upon the ends of the pipes and adapted to commingle the sprayed milk and fat, and a means for producing a vacuum in the mixing receptacle.

2. An apparatus for the production of a compound of skimmed milk and vegetable fat consisting of a whole milk receiving and heating device consisting of a receptacle and an agitating and heating coil located therein, a milk separator, a skimmed milk receiving and heating device consisting of a receptacle and a heating coil located therein, an evaporating and emulsifying drum adapted to withstand reduced pressure therein, a vegetable fat receiving and heating device consisting of a fat receiver and a heating coil located therein, a finished product receiver, a pipe connecting the skimmed milk receiving and heating device with the evaporating and emulsifying drum, a pipe connecting the vegetable fat receiving and heating device with the evaporating and emulsifying drum, the ends of the pipes converging, sprayers located upon the ends of the pipes and adapted to commingle the sprayed milk and fat, and a means for producing a vacuum in the evaporating and emulsifying drum.

In testimony whereof, I have hereunto subscribed my name this 5th day of April, 1917.

JOHN F. ENZ.

Witnesses:
 ALMA BOSSE,
 H. E. HOWARD.